(12) United States Patent
Layne

(10) Patent No.: US 10,087,012 B1
(45) Date of Patent: Oct. 2, 2018

(54) ADJUSTABLE CONVEYOR BELT GUIDE RAIL WITH RETRACTABLE SUPPORT

(71) Applicant: SPAN TECH LLC, Glasgow, KY (US)

(72) Inventor: James L. Layne, Bowling Green, KY (US)

(73) Assignee: SPAN TECH LLC, Glasgow, KY (US)

( * ) Notice: Subject to any disclaimer, the term of this patent is extended or adjusted under 35 U.S.C. 154(b) by 0 days.

(21) Appl. No.: 15/364,622

(22) Filed: Nov. 30, 2016

Related U.S. Application Data

(60) Provisional application No. 62/260,983, filed on Nov. 30, 2015.

(51) Int. Cl.
| | | |
|---|---|---|
| *B65G 15/60* | (2006.01) | |
| *B65G 21/20* | (2006.01) | |
| *B65H 75/44* | (2006.01) | |
| *B65H 75/48* | (2006.01) | |

(52) U.S. Cl.
CPC ..... *B65G 21/2072* (2013.01); *B65H 75/4423* (2013.01); *B65H 75/486* (2013.01)

(58) Field of Classification Search
CPC .. B65G 15/64; B65G 21/2072; B65G 37/005; B65H 75/4423
USPC ................................ 198/836.1, 836.2, 836.3
See application file for complete search history.

(56) References Cited

U.S. PATENT DOCUMENTS

| | | | | |
|---|---|---|---|---|
| 3,776,350 A | * | 12/1973 | Tice ................... | B65G 21/2072 198/836.3 |
| 3,897,869 A | * | 8/1975 | Michael ................ | B65G 25/06 156/433 |
| 4,214,744 A | * | 7/1980 | Evans .................... | B65H 29/16 198/836.2 |
| 4,236,625 A | | 12/1980 | Smith et al. | |
| 4,582,192 A | * | 4/1986 | Rojlar .................... | B65G 23/28 198/575 |
| 4,982,836 A | * | 1/1991 | Summers ............... | B65G 15/60 198/838 |
| 5,201,910 A | * | 4/1993 | Sheeter .................. | A01C 11/02 111/104 |
| 5,211,278 A | * | 5/1993 | Mendenhall ............ | B26D 3/11 198/626.4 |
| 5,277,295 A | * | 1/1994 | Grecksch ............... | D01H 9/001 198/457.01 |
| 5,291,988 A | | 3/1994 | Leonard | |
| 5,685,415 A | * | 11/1997 | East ....................... | B65G 15/00 198/812 |
| 5,706,933 A | | 1/1998 | Ouellette | |
| 5,782,339 A | | 7/1998 | Drewitz | |
| 5,791,453 A | * | 8/1998 | Schmits ................. | B65G 17/26 198/626.6 |

(Continued)

*Primary Examiner* — Joseph A Dillon, Jr.

(74) *Attorney, Agent, or Firm* — Andrew D. Dorisio; King & Schickli, PLLC

(57) ABSTRACT

An apparatus for guiding products along a conveyor in a conveying direction is provided. The apparatus includes a first guide rail for at least partially forming a conveying path for products on the conveyor. At least one flexible support provides support for the first guide rail along the conveyor. The at least one flexible support is adapted for being extended and retracted to selectively position the first guide rail relative to the conveyor. The support may be pivotally mounted to the guide rail. The guide rail may also include fixed and slidable portions, including possibly curved portions, which allow for a sliding joint to be formed.

19 Claims, 4 Drawing Sheets

(56) References Cited

U.S. PATENT DOCUMENTS

| | | | |
|---|---|---|---|
| 5,820,057 A * | 10/1998 | Decarolis | B65H 75/486 242/375.3 |
| 5,927,480 A | 7/1999 | McCaffrey et al. | |
| 6,003,662 A | 12/1999 | McCaffrey et al. | |
| 6,050,396 A | 4/2000 | Moore | |
| 6,244,429 B1 | 6/2001 | Drewitz et al. | |
| 6,378,695 B1 | 4/2002 | Rinne | |
| 6,398,145 B1 * | 6/2002 | Yang | B65H 75/486 242/375 |
| 6,612,785 B1 | 9/2003 | Ouellette | |
| 6,619,473 B2 * | 9/2003 | Romeo | B65G 21/02 198/836.1 |
| 6,736,573 B1 * | 5/2004 | Simkowski | B65G 51/035 198/836.4 |
| 6,805,314 B2 * | 10/2004 | Hopper | B25H 1/0028 242/375.1 |
| 6,889,823 B2 | 5/2005 | Delaporte et al. | |
| 7,717,254 B2 * | 5/2010 | Brackley | B65G 49/063 198/626.1 |
| 7,735,636 B2 | 6/2010 | Lundberg | |
| 8,132,666 B2 | 3/2012 | McAlister et al. | |
| 8,418,840 B2 * | 4/2013 | Trieb | B65G 21/04 198/681 |
| 8,464,864 B2 | 6/2013 | Bell et al. | |
| 8,490,780 B2 | 7/2013 | Bell et al. | |
| 8,499,921 B1 | 8/2013 | Orndorff et al. | |
| 8,695,787 B2 | 4/2014 | Bell et al. | |
| 8,776,997 B2 | 7/2014 | Spence | |
| 8,955,668 B2 * | 2/2015 | Cavallaro, III | B65G 49/063 198/626.5 |
| 9,073,698 B2 | 7/2015 | Huettner et al. | |
| 9,132,961 B2 | 9/2015 | Franzaroli | |
| 9,725,246 B2 * | 8/2017 | Pawelski | B65G 21/2072 |
| 2003/0116410 A1 * | 6/2003 | Ledingham | B65G 21/2072 198/861.1 |
| 2004/0035685 A1 * | 2/2004 | Fujiwara | B65G 15/00 198/831 |
| 2011/0040403 A1 * | 2/2011 | Langanki | B65G 21/2072 700/228 |
| 2012/0097505 A1 * | 4/2012 | Berger | B65G 21/16 198/836.3 |
| 2012/0168284 A1 * | 7/2012 | Pawelski | F15B 15/1404 198/836.3 |
| 2013/0232914 A1 * | 9/2013 | Vasse | B65B 11/10 53/203 |
| 2014/0353415 A1 * | 12/2014 | Katsuramaki | H02G 11/02 242/371 |
| 2017/0066596 A1 * | 3/2017 | Weickert | B65G 21/2072 |
| 2017/0275943 A1 * | 9/2017 | Huang | B65H 75/486 |

* cited by examiner

ADJUSTABLE CONVEYOR BELT GUIDE RAIL WITH RETRACTABLE SUPPORT

This application claims the benefit of U.S. Provisional Patent Application Ser. No. 62/260,983, the disclosure of which is fully incorporated herein by reference.

TECHNICAL FIELD

This disclosure relates to the article conveying arts, and in particular, to an adjustable conveyor belt guide rail with a retractable support.

BACKGROUND

Conveyors typically have rails positioned along each side of the conveyor chain or belt in order to guide a product along the conveying path. Products travel between the rails, which are positioned to ensure that the products remain on the conveying path. When a larger or smaller product is conveyed, or the width of the conveying path otherwise needs to be adjusted to accommodate an increased or reduced flow of products, the guide rails must be adjusted to fit the situation.

Conventional guide rail adjustment systems use extending guide rods, which support a bracket attached to the guide rail. When the guide rails need to be adjusted, the brackets can be moved along the guide rods. These guide rods protrude outwardly away from the conveyor and into the surrounding area, thus increasing the overall width and footprint of the conveyor. The guide rails including rigid rods also create an unappealing look, since the extended portions of the rods project from the conveyor sides.

Accordingly, a need is identified for a guide rail system with enhanced adjustability.

SUMMARY

According to one aspect of the disclosure, an apparatus for guiding one or more products along a conveyor is provided. The apparatus comprises a first guide rail for guiding the one or more products on the conveyor. At least one flexible support is also provided for supporting the first guide rail along the conveyor. The at least one flexible support adapted for being extended and retracted to selectively position the first guide rail relative to the conveyor.

In one embodiment, the support comprises a coil. A bracket may also be provided for supporting the coil. A housing may also house the coil, which may include a spring for connecting to the coil. A retainer is also provided for retaining the flexible support at an extended position in some embodiments.

The support may be pivotally mounted to the first guide rail, and may be flexible in a conveying direction but not in a vertical direction. A second guide rail may also be provided a second guide rail for guiding products on the conveyor, along with at least one flexible support for supporting the second guide rail along the conveyor, the at least one flexible support adapted for being extended and retracted to selectively position the second guide rail relative to the conveyor. The first and second guide rails may be opposed to each other, or along the same side of the conveyor.

The guide rail may also comprise first and second portions adapted for sliding relative to each other. The first portion of the guide rail may be curved. The second portion may be straight or curved.

A further aspect of the disclosure pertains to an apparatus for guiding one or more products along a conveyor. The apparatus comprises a first guide rail for guiding the one or more products and at least one support for supporting the first guide rail, the at least one support adapted for being extended and retracted within a housing to alter the position of the guide rail relative to the conveyor. The at least one support may comprise a coil, and a retainer may be provided for retaining the at least one support at an extended position. The at least one support may comprise a flexible material.

In one embodiment, a second guide rail for guiding products on the conveyor is also provided. At least one support is provided for supporting the second guide rail along the conveyor. The support adapted for being extended and retracted to selectively position the second guide rail relative to the conveyor. Either guide rail may comprise first and second portions adapted for sliding relative to each other.

Still a further aspect of the disclosure pertains to an apparatus for guiding products along a conveyor. The apparatus comprises a guide rail for guiding the products and at least one support for supporting the guide rail, the support being pivotally connected to the guide rail. The support may comprise a flexible support adapted for being retracted within a housing. The guide rail may also comprise first and second portions adapted for sliding relative to each other.

BRIEF DESCRIPTION OF THE DRAWING FIGURES

The accompanying drawing figures incorporated herein and forming a part of the specification, illustrate several aspects of the disclosed invention, serve to explain certain principles thereof. In the drawing figures.

Reference will now be made in detail to the present preferred embodiments of an adjustable guide rail for a conveyor, examples of which are illustrated in the accompanying drawing figures.

DETAILED DESCRIPTION

Figure 1:
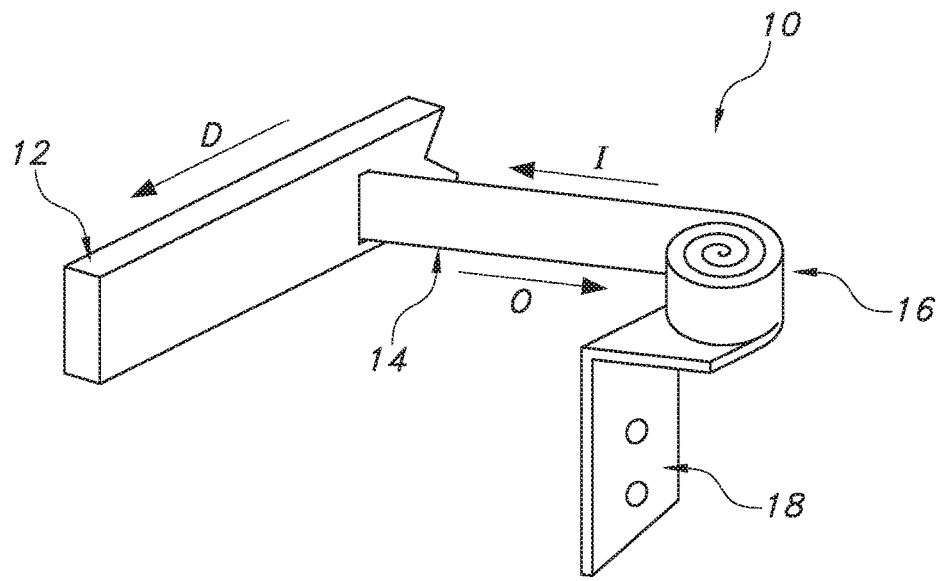
FIG. 1 is a perspective view of one embodiment of an adjustable guide rail including a flexible, retractable support.

With reference to FIG. 1, one possible embodiment of an adjustable guide rail system 10 forming one aspect of the invention is schematically illustrated. As illustrated, the system 10 may comprise a guide rail 12 for guiding articles along a conveying path and in a conveying direction D. The guide rail 12 may be supported by a support 14, which may be flexible and capable of retracting to change the relative position of the conveying path.

In one embodiment, the support 12 may be comprised of a material (e.g., spring steel) that is sufficiently rigid in one direction (e.g., a transverse or vertical direction) to support the weight of the guide rail to which it is attached, but sufficiently flexible in at least one other direction (e.g., the conveying direction D) to be wound, such as into a coil 16. The coil 16 may be supported by a bracket 18, which may in turn be mounted to a bed or frame forming part of an associated conveyor (see, e.g., FIG. 6).

As can be appreciated, by way of being selectively extended or retracted, the support 14 creates an enhanced level of adjustability for an associated guide rail 12. Specifically, extending or retracting the support 14 allows the guide rail 12 to be configured to provide a conveying path for a number of differently sized objects to be conveyed. For example, when a smaller sized object is desired to be conveyed, the guide rail 12 need only be moved in an inward direction I transverse to the conveying direction D. This narrows the conveying path, and allows for a customizable arrangement for guiding a variety of differently sized objects.

Likewise, if it is desired to convey a larger sized object, the guide rail 12 need only be moved in an outward direction O transverse to the conveying direction D. The guide rail support 14 may be pivotally attached to the guide rail 12, in order to allow selective narrowing of only a portion of the conveying path. The bracket 18 may also be pivotally attached to further improve the adjustability of the guide rail 12.

Figure 2:
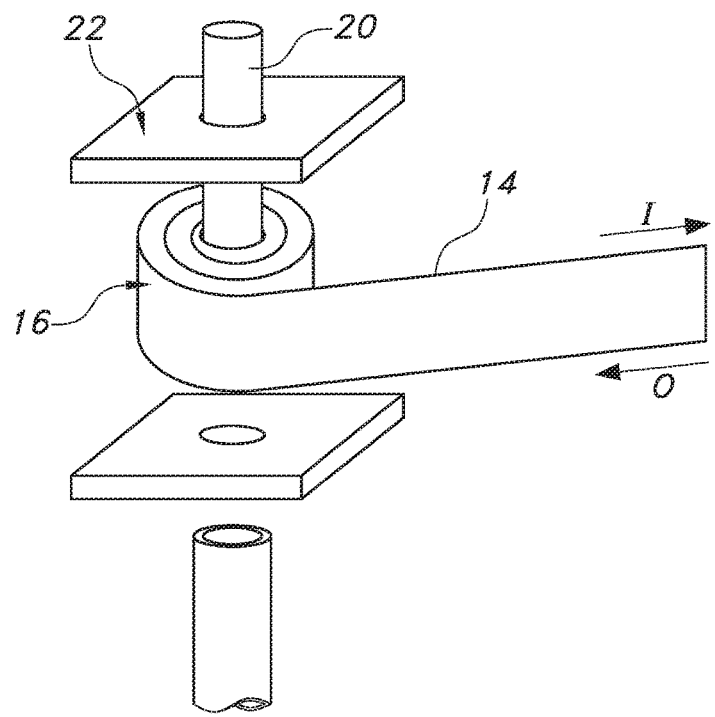
FIG. 2 is a perspective view of another embodiment.
Figures 3A, 3B:
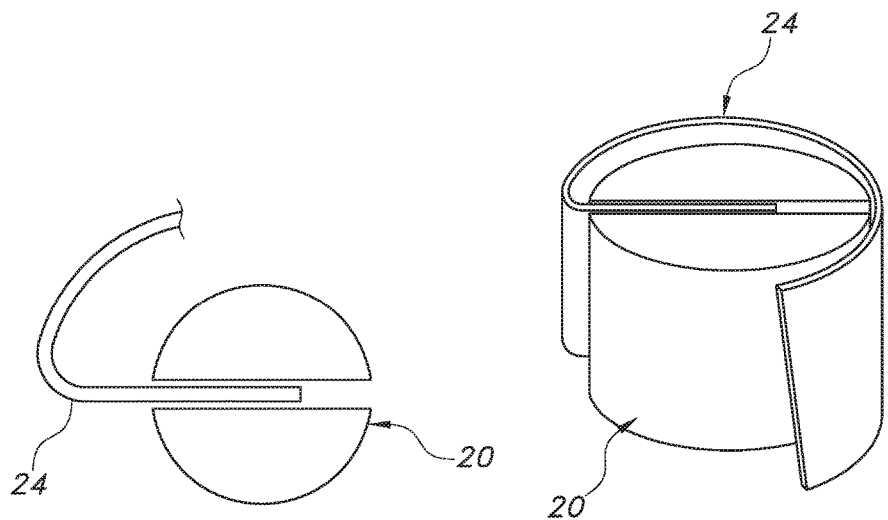
FIGS. 3a and 3b are top and perspective views illustrating additional features of the support arrangement.
Figure 4:
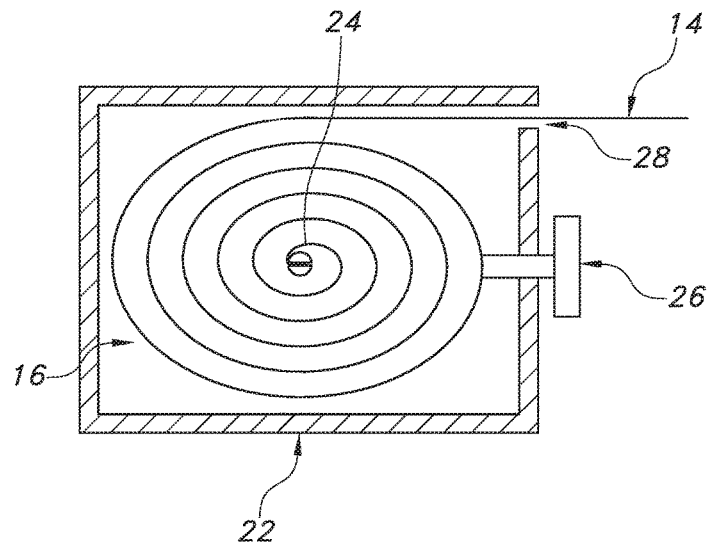
FIG. 4 is a schematic view illustrating further details of one possible embodiment of the support.

As illustrated in FIG. 2, the bracket 18 may further include a post 20 supporting a housing 22, which may comprise a pair of spaced plates to provide a clamping force for retaining the support 14 in an extended or retracted condition by fixing the movement of the coil 16. The housing 22 may completely enclose the coil 16, including when fully retracted, and may include an opening 28 through which the support 14 may pass out of the housing 22 for engaging and supporting the guide rail 12 in the desired manner.

In the illustrated embodiment, the retractable coil 16 acts in a similar manner to a retractable tape measure (which as is well known may include a retractable metallic tape having a C-shaped cross-section), and is connected to a biasing element 24 to bias the support 14 into the housing 22 in the absence of an externally applied retaining force. For example, a retainer 26 secures the coil 16 in the desired position once the support 14 reaches the desired extension for providing a conveying path for a particular object. While the retainer 26 is shown as a simple pusher, it should be appreciated that a more sophisticated arrangement, such as a ratchet and pawl with a corresponding release, could also be used.

Figure 5:
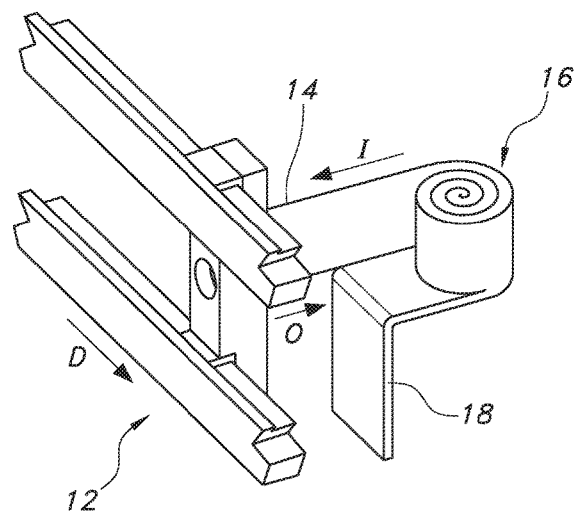
FIG. 5 is a partially cutaway perspective view showing of a support arrangement according to the disclosure.

As illustrated in FIG. 5, a guide rail 12 with two (upper and lower) rails may also be used in combination with the guide rail support 14. As described above, the guide rail support 14 may be pivotally attached, or it may be rigidly attached, depending on the desired adjustability and rigidness of the guide rails.

Figure 6:
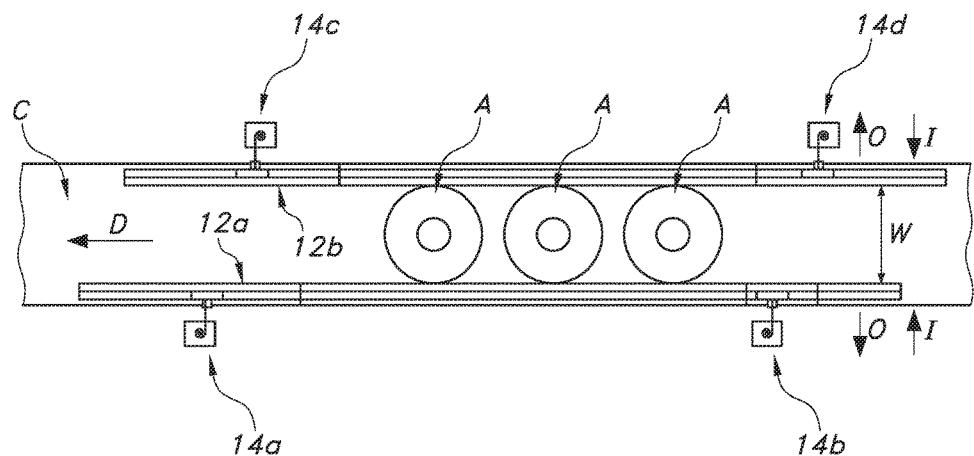
FIG. 6 is a top view illustrating one application of the support arrangement.

FIG. 6 illustrates an overview of a possible arrangement of the adjustable guide rail support system 10. The conveyor belt or chain C travels in a direction D. Guide rails 12a and 12b are shown for guiding articles A along the conveying path. The adjustable guide rail supports 14a and 14b are supporting guide rail 12a and the adjustable guide rail supports 14c and 14d are supporting guide rail 12b. Thus, if it is desired adjust the conveying path width W to guide differently sized articles, guide rail 12a (along with guide rail supports 14a and 14b) and guide rail 12b (along with guide rail supports 14c and 14d) may be moved in either direction I or O transverse the conveying direction D in order to widen or narrow the conveying path width W.

Figure 7:
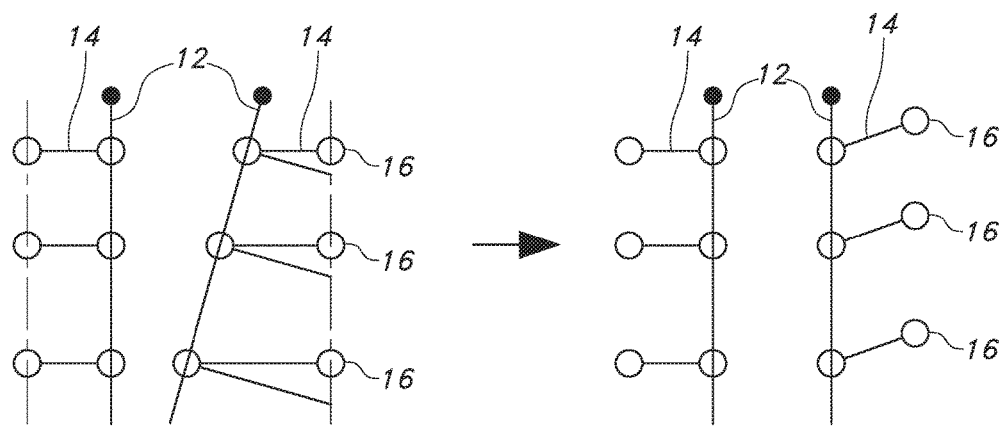
FIG. 7 is a schematic view illustrating the manner in which a support arrangement may be selectively adjusted by using pivoting connections between the supports and the guide rail.

FIG. 7 shows that different supports 14 along a conveyor may be extended or retracted different amounts, as desired. To allow this type of arrangement, the support(s) 14 may be mounted to the guide rail 12 in a manner that allows for pivoting movement. Accordingly, the coil(s) 16 may remain at a fixed location, while the guide rail 12 is moved as desired. As can be appreciated, this allows for the conveying path width to be selectively narrowed, such as for article consolidation, and easily re-adjusted as necessary or desired for a particular conveying configuration.

Figure 8:
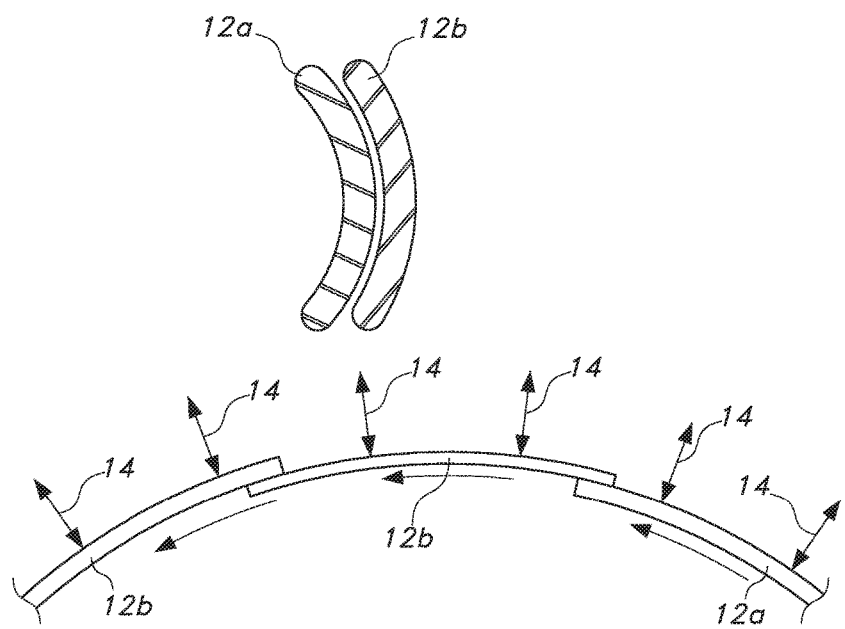
FIG. 8 illustrates one manner of providing portions of the conveyor guide rail that slide relative to each other.

FIG. 8 illustrates that the guide rail 12 may comprise a slip joint comprised of a fixed portion 12a and one or more slidably mounted or slipping portions 12b, which may overlap with the fixed portion 12a. When used along a curve, this allows for the guide rail 12 to provide the desired extension and retraction, such as via supports 14, to accommodate a particular article being conveyed or form a particular conveying path. Hence, one o both of the portions 12a, 12b may be curved, but use of the supports 14 in connection with straight portions that are connected by slip joints is also possible.

The foregoing descriptions of various embodiments of an adjustable guide rail and related methods provide illustration of the inventive concepts. The descriptions are not intended to be exhaustive or to limit the disclosed invention to the precise form disclosed. Modifications or variations are also possible in light of the above teachings. Any elements described herein as singular can be pluralized (i.e., anything described as "one" can be more than one), and plural elements can be used individually. Characteristics disclosed of a single variation of an element, the device, the methods, or combinations thereof can be used or apply for other variations, for example, dimensions, burst pressures, shapes, materials, or combinations thereof. Any species element of a genus element can have the characteristics or elements of any other species element of that genus. The term "comprising" is not meant to be limiting. The above-described configurations, elements or complete assemblies and methods and their elements for carrying out the invention, and variations of aspects of the invention can be combined and modified with each other in any combination.

The invention claimed is:

1. An apparatus for guiding one or more products along a conveyor in a conveying direction, comprising:
   a first guide rail for guiding the one or more products on the conveyor; and
   at least one support for supporting the first guide rail along the conveyor, the at least one support adapted for being extended and retracted to selectively position the first guide rail relative to the conveyor, the support being rigid in a vertical direction to support the weight of the first guide rail, but flexible in at least the direction transverse to the conveying direction to collapse.

2. The apparatus of claim 1, wherein the support comprises a coil.

3. The apparatus of claim 2, further including a bracket for supporting the coil.

4. The apparatus of claim 2, further including a housing for housing the coil.

5. The apparatus of claim 1, further including a retainer for retaining the flexible support at an extended position.

6. The apparatus of claim 1, wherein the support is pivotally mounted to the first guide rail.

7. The apparatus of claim 1, further including:
a second guide rail for guiding products on the conveyor; and
at least one flexible support for supporting the second guide rail along the conveyor, the at least one flexible support adapted for being extended and retracted to selectively position the second guide rail relative to the conveyor.

8. The apparatus of claim 1, wherein the guide rail comprises first and second portions adapted for sliding relative to each other.

9. The apparatus of claim 1, wherein the first portion of the guide rail is curved.

10. An apparatus for guiding one or more products along a conveyor, comprising:
a first guide rail for guiding the one or more products; and
at least one support for supporting the first guide rail, the at least one support adapted for being extended and retracted within a housing to alter the position of the guide rail relative to the conveyor the at least one support being rigid in a vertical direction to support the weight of the first guide rail, but flexible in at least the direction transverse to the conveying direction.

11. The apparatus of claim 10, wherein the at least one support comprises a coil.

12. The apparatus of claim 10, further including a retainer for retaining the at least one support at an extended position.

13. The apparatus of claim 10, wherein the at least one support comprises a flexible material.

14. The apparatus of claim 10, further comprising:
a second guide rail for guiding products on the conveyor; and
at least one support for supporting the second guide rail along the conveyor, the support adapted for being extended and retracted to selectively position the second guide rail relative to the conveyor.

15. The apparatus of claim 2, wherein the guide rail comprises first and second portions adapted for sliding relative to each other.

16. An apparatus for guiding products along a conveyor, comprising:
a guide rail for guiding the products; and
at least one support for supporting the guide rail, the support being pivotally connected to the guide rail, the at least one support being rigid in a vertical direction to support the weight of the first guide rail, but flexible in at least the direction transverse to the conveying direction to collapse.

17. The apparatus of claim 16, wherein the support comprises a flexible support adapted for being retracted within a housing.

18. The apparatus of claim 16, wherein the guide rail comprises first and second portions adapted for sliding relative to each other.

19. The apparatus of claim 10, wherein the at least one support is rigid in a vertical direction to support the weight of the first guide rail, but flexible in at least the conveying direction to collapse.

\* \* \* \* \*